UNITED STATES PATENT OFFICE.

PAUL THOMASCHEWSKI AND HEINRICH RAEDER, OF VOHWINKEL, AND WALTER MIEG AND PAUL FISCHER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUISH-GRAY VAT DYE.

971,224.  Specification of Letters Patent.  Patented Sept. 27, 1910.

No Drawing. Original application filed February 12, 1910, Serial No. 543,493. Divided and this application filed April 21, 1910. Serial No. 556,653.

*To all whom it may concern:*

Be it known that we, PAUL THOMASCHEWSKI and HEINRICH RAEDER, residing at Vohwinkel, and WALTER MIEG and PAUL FISCHER, residing at Elberfeld, Germany, citizens of the German Empire, have invented new and useful Improvements in Bluish-Gray Vat Dyes, of which the following is a specification.

Our present invention relates to the manufacture and production of a new vat dye of the anthracene series.

The process for its preparation consists in condensing 1-benzoylamino-4-chloroanthraquinone with 1-benzoylamino-4-aminoanthraquinone. The new product is after being dried and pulverized and crystallized from nitrobenzene a dark powder having a metallic luster, soluble in concentrated sulfuric acid with a green color, turning brown after some time. It yields on treatment with hydrosulfite and caustic soda lye a vat suitable for dyeing cotton fast bluish-gray shades.

In carrying out the new process practically we can proceed as follows, the parts being by weight: A mixture of 12 parts of 1-benzoylamino-4-chloroanthraquinone, 11 parts of 1-benzoylamino-4-aminoanthraquinone, 2 parts of $CuCl_2$, 6 parts of anhydrous sodium acetate and 200 parts of nitrobenzene is heated to boiling for about 3 hours. The resulting product is precipitated from the melt with alcohol. After cooling the dye is filtered off, washed with water and alcohol.

We claim:—

The herein described new vat dyestuff of the anthracene series which can be obtained from 1-benzoylamino-4-chloroanthraquinone and 1-benzoylamino-4-aminoanthraquinone, which dyestuff is, after being dried and pulverized, a dark powder having a metallic luster, which is soluble in concentrated sulfuric acid with a green color soon turning brown; yielding a vat with hydrosulfite and caustic soda lye, which vat dyes cotton bluish-gray shades, substantially as described.

In testimony whereof we have hereunto set our hands in the presence of two subscribing witnesses.

PAUL THOMASCHEWSKI. [L. S.]
HEINRICH RAEDER. [L. S.]
WALTER MIEG. [L. S.]
PAUL FISCHER. [L. S.]

Witnesses:
OTTO KÖNIG,
WALTER VONNEGUT.